United States Patent [19]

Clement

[11] Patent Number: 4,595,322

[45] Date of Patent: Jun. 17, 1986

[54] SPADE DRILL BIT

[76] Inventor: Burke Clement, 7023 Gleason Rd., Westview Towers, Apt. 1214, Knoxville, Tenn. 37919

[21] Appl. No.: 628,587

[22] Filed: Jul. 6, 1984

Related U.S. Application Data

[63] Continuation-in-part of Ser. No. 430,890, Sep. 30, 1982, Pat. No. 4,503,920, which is a continuation-in-part of Ser. No. 291,640, Aug. 10, 1981, Pat. No. 4,400,119.

[51] Int. Cl.$^4$ .................. B23B 51/02; E21B 10/44
[52] U.S. Cl. .................. 408/230; 175/394; 175/410; 175/415; 408/223; 408/224
[58] Field of Search ............... 408/230, 233, 713, 223, 408/224, 210, 225; 409/131; 175/410, 394, 415

[56] References Cited

U.S. PATENT DOCUMENTS

| | | | |
|---|---|---|---|
| 2,673,714 | 3/1954 | Hargrave | 175/410 X |
| 3,076,357 | 2/1963 | Benjamin et al. | 408/233 X |
| 4,060,335 | 11/1977 | Holloway | 408/233 |
| 4,383,785 | 5/1983 | Rice | 409/131 |

Primary Examiner—William R. Briggs
Attorney, Agent, or Firm—Pitts and Brittian

[57] ABSTRACT

An improved spade type bit for use in drilling metal, masonry and the like. This bit has a replaceable transverse bar of hardened material in the tip thereof with symmetrical end surfaces sloping away from a central chisel point located on the axis of the bit. One of these surfaces is provided along its length with a groove extending from a cutting lip to the trailing edge, with the groove width and depth at the trailing edge having at least the same dimensions as at the cutting edge. Preferably the dimensions of the groove at the trailing edge are slightly greater than those at the cutting edge. The second of the surfaces has an outer portion with a reduced angle with respect to the axis of the bit as compared to the angle of the inner portion. This construction provides for the accurate drilling of holes in metal, masonry and the like and further accomplishes the drilling at increased penetration rates with the same or lower axial force applied to the bit. The replaceable feature facilitates accurate resharpening of the cutting edges as well as selecting a particular configuration and material for a given drilling operation.

9 Claims, 6 Drawing Figures

SPADE DRILL BIT

This application is a continuation-in-part of application Ser. No. 430,890 filed Sept. 30, 1982, entitled "Improved Masonry Bit", now Pat. No. 4,503,920 which is a continuation-in-part of application Ser. No. 291,640, filed Aug. 10, 1981, now matured into U.S. Pat. No. 4,400,119 issued Aug. 23, 1983, to Burke Clement, entitled "Improved Twist Drill".

TECHNICAL FIELD

This invention relates generally to rotary bits used for drilling into metal, masonry and like material, and more particularly to a rotary spade drill bit of the type having a transverse hard insert at the cutting tip. The improvement provides increased speed of penetration into the drilling surface at reduced axial pressures.

BACKGROUND ART

Numerous devices are utilized for producing substantially circular holes in masonry, metal, and like material. One such device for drilling masonry is the "star drill" which is an elongated tool having a toughened star-shaped cutting end which is repeatedly driven against the masonry thereby causing the surface immediately below the cutting end to become pulverized. This pulverized material can then be removed from the hole in any suitable manner as by a stream of air. More commonly, however, a rotary drill bit is utilized for preparing such holes in masonry and metal. The most common of these rotary bits is a specialized form of twist drill utilizing a piece of hardened material, such as tungsten carbide, inserted transversely across the cutting end of the drill bit and this hardened material carries the cutting lips of the drill. This is referred to as a spade drill. Conventionally the spade drill bit has a pair of flutes extending the length of the drill to a point where a shank is formed for securing the bit in a rotary drive mechanism. The edges of the flutes (or lands) are normally dimensioned such that they do not contact the wall of a drill hole in order that a reduced friction between the drill and the wall hole is achieved. The flutes are utilized to withdraw cut material as the drill bit moves into the material being drilled. Because of the hardness of masonry (including rock, brick, etc.), and metal, the drilling operation is normally quite slow, and rather high pressure must be exerted axially on the drill bit to accomplish the drilling. Further, the cutting lips gradually become rounded requiring a resharpening of the bit. Part of this rounding occurs because the insert reaches substantially high temperatures due to friction against the masonry or metal material.

Although the cutting lips of a newly manufactured spade drill bit are normally symmetrical, the symmetry may be destroyed when the cutting lips are restored as by grinding with an appropriate sharpening apparatus because it is difficult to grind each of the lips equally. When asymmetry occurs, the drill bit tends to move from an axial cutting position and wander from the axis of the desired hole. Furthermore, the cutting lip which performs the greatest amount of cutting from this non-symmetrical shape is dulled more quickly and thus the drill bit requires more frequent sharpening.

Accordingly, it is one object of the present invention to provide a spade drill bit for rotary operation which penetrates masonry and metal material at a higher rate with less pressure, and thus develops less heat, than drill bits of the prior art.

It is another object of the present invention to provide a rotary spade drill bit which achieves cutting along a true axis of the desired hole in masonry or metal material.

It is also an object of the present invention to provide an improved spade drill bit which requires less sharpening maintenance.

It is still another object of the present invention to provide a rotary spade drill bit which is composed of two separate parts, the cutting bar and the shank, whereby the cutting bar can be selectively inserted and secured to the drill bit shank for use in selected drilling assignments.

Other objects and advantages of the invention will become apparent upon reading the detailed description with reference to the drawings.

DISCLOSURE OF THE INVENTION

In accordance with the invention, a spade drill bit is provided which accomplishes increased drilling speed and penetration into masonry, metal, or like material, at reduced axial pressures. Specifically, the improved spade drill bit is of the type having a singular cutting bar of hardened material extending across the cutting end of the drill bit. This hardened bar carries a pair of generally symmetrical cutting lips on opposed portions which recede from a central chisel point of the cutting bar. One of these portions, at a position substantially midway between a radial edge and the chisel point, is provided with a groove extending from the cutting lip to the trailing edge of that portion of the cutting bar. The depth and width of the groove at the trailing edge is at least equal to or greater than the respective dimensions of the groove at the cutting lip. The cutting bar is a separate piece from the shank, and is inserted into and secured through the shank for selective use in accordance with drilling needs.

BEST MODE FOR CARRYING OUT THE INVENTION

Figure 1:
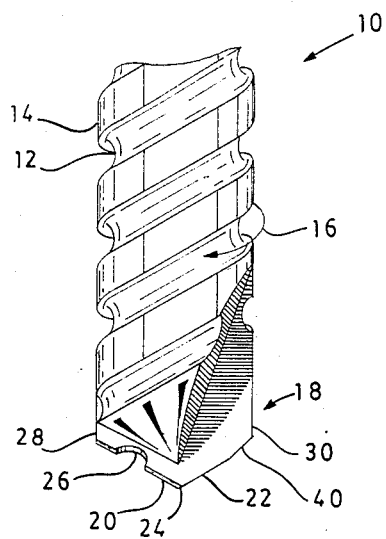
FIG. 1 is a partial elevational view of the present invention.

Referring to FIG. 1, shown therein generally at 10 is the drill bit embodiment of application Ser. No. 430,890. A central shaft or web 12 supports at least one spiral flute having a land 14. When the drill bit 10 is rotated in a direction illustrated at 16 (see FIG. 2), the upper edge of the flute carries away debris produced by the cutting into masonry in a conventional manner. Permanently mounted in the end of the shaft 12 is a bar 18 of hardened material (typically silicon- or tungsten-carbide) which generally will withstand the wear of masonry materials. This bar 18 has a pair of forwardly extending surfaces 20, 22 which carry cutting lips on a forward edge, with respect to the direction of rotation, and which surfaces recede to a trailing edge. The surfaces 20, 22 join at a chisel point 24 substantially on the axis of the shaft 12.

One of the surfaces (e.g., 20) of the bar 18 is provided with a groove 26 generally midway between the chisel point 24 and the most radial edge 28 of surface 20. This radial edge 28, and a corresponding radial edge 30 of surface 22, extend radially from the axis of the drill bit a distance greater than the radial extremity of the land 14 as is common practice in masonry drill bits. The groove 26 may have a U-shaped cross-section, as shown, or may have other cross-sections such as a V-shape or a rectangular shape. The width and depth of the groove at the trailing edge of the surface 20 are at least equal to, but preferably greater than, the depth and width of the groove at the cutting edge.

In order that the surface (i.e., 20) containing the groove 26 always assumes the role of the leading cutting lip during drilling, the other surface 22 is modified as shown. Specifically, the surface 22 has an outer portion 40 that forms a reduced angle with respect to the axis of the drill bit. The length of this portion 40 is substantially equal to the spacing between the outer edge 42 (see FIG. 3) and the radial edge 28. Accordingly, the leading edge 32 (see FIG. 2) is always the leading cutting lip of the drill bit. More detail with regard to this construction will be described with reference to FIG. 3.

Figure 2:
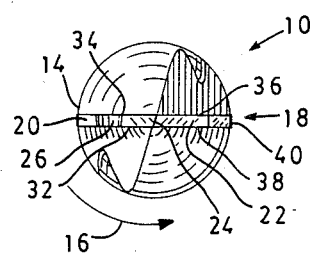
FIG. 2 is an end view of the drill bit shown in FIG. 1.

An end view of the masonry bit of the present invention shown in FIG. 2. Identified therein are the end surfaces 20, 22 of the bar 18. It may be seen that surface 20 has a leading or cutting edge 32 and a trailing edge 34. Similarly surface 22 has a leading or cutting edge 36 and a trailing edge 38. The groove 26 in the surface 20 is shown in this view to have a greater width in the trailing edge 34 than in the cutting edge or cutting lip 32. This difference in dimension permits passage of material through the groove 26 without substantial wear upon the surface of the groove.

Figure 3:
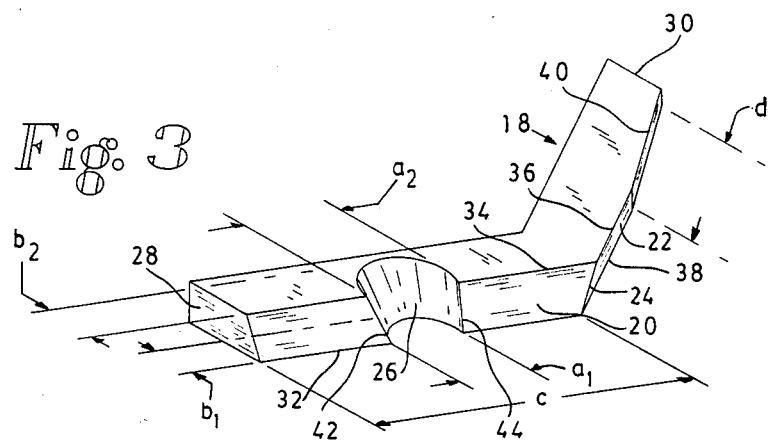
FIG. 3 is a perspective drawing of the hardened insert of the drill bit of the present invention enlarged over that shown in FIGS. 1 and 2.

A detailed perspective view of just the cutter bar 18, as enlarged, is shown in FIG. 3. The construction of the groove 26 and its respective dimensions are more clearly shown in this figure. For example, the dimension from the chisel point 24 to the peripheral edge 28 of the surface 20 is designated as c. Generally midway in this length c is located the groove 26, shown again as a U-shaped groove. The width $a_1$ of the groove 26 at the cutting edge 32 is equal to or less than the width $a_2$ of the groove at the trailing edge 34. Similarly the depth of the groove at the cutting edge, which depth is designated as $b_1$, is equal to but preferably less than the depth $b_2$ at the trailing edge. Typically, the groove 26 is about ⅛ to 3/16 inch wide and ⅛ to 3/16 inch deep when the length of the surface 20 is about ½ inch and the thickness of the insert is about ⅛ inch. Dimensions substantially less than these will not perform the desired funtion: a substantially greater proportionate dimension will reduce the cutting efficiency of the masonry bit.

In FIG. 3, the surface 40 as associated with the surface 22 is more clearly seen. This surface at its outer end has a different angle with respect to the axis of the drill bit than does the surface 22. This surface 40 extends inwardly from the radial end 30 a distance d. This distance is substantially equal to the distance between the outermost edge 42 of the groove 26 and the radial edge 28 of the surface 20. In this construction, therefore, principal cutting surfaces occur from the radial edge 28 to the outer point 42 of the groove 26, and from the inner edge 44 of the groove 26 to the central chisel edge 24. The cutting edge 38 to the beginning of the surface 40 then cuts material left by the groove 26.

The operation of the present invention, particularly with respect to the principal embodiment illustrated in FIGS. 1-3, is as follows. As the bit is rotated in the direction shown, the material is cut by the cutting lips 36 and 32 except for the portion of the width of the groove 26 and along portion 40. As the bit is continued to be rotated, the cutting lip 36 removes any material which is bypassed by the groove 26, and cutting lip 32 removes material bypassed by portion 40. This type of cutting, as demonstrated by experimentation brings about a penetration of masonry and metal at a higher rate with less axial pressure upon the drill bit than a conventional masonry or spade drill bit. Furthermore, the groove 26 permits an escape of material removed from the masonry or the metal whereby said material is captured by the upper edge of the flute for removal from the hole being drilled. The increased speed of penetration and the reduction of the required axial pressure upon the drill bit results in less wear upon the cutting surfaces and thereby necessitates less frequent resharpening of the cutting lips of the drill bit.

Figure 4:
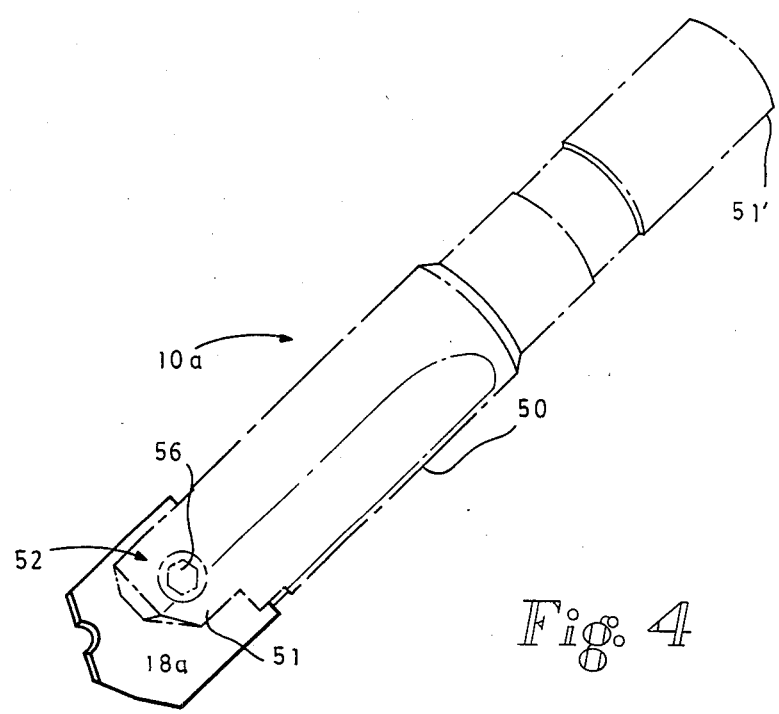
FIG. 4 is a perspective view of one embodiment of an improved spade drill bit.
Figure 5:
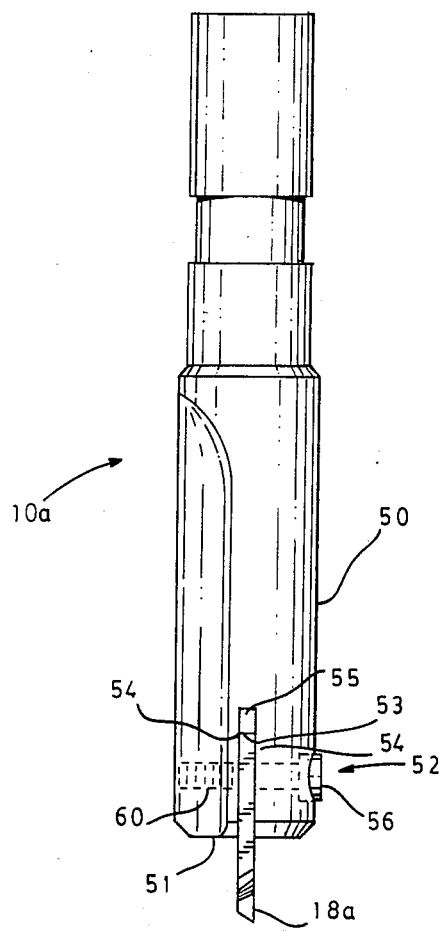
FIG. 5 is an elevational view of a shank member with cutting bar releasably secured in position therein.

Referring to FIGS. 4 and 5, shown therein generally at 10a is an improved embodiment of a spade-type drill bit. A shank member 50 is provided with an attachment means 52 at one end whereby the cutter bar 18a is releasably attached to the outer end 51 of the shank member 50. The other end 51' of the shank 50 is used for the releasable attachment of a suitable rotating means (not shown). The shank can be provided with one or more spiral flutes if desired. The attachment means 52 is provided with a pair of parallel arms 54 extending medianly axially along the outer end 51 of the shank member 50. The parallel arms 54 define a medianly axially positioned slot 55 which slidably receives the planar body 53 of the cutter bar 18a to a point where it is longitudinally secured by a socket head screw 56.

Figure 6:
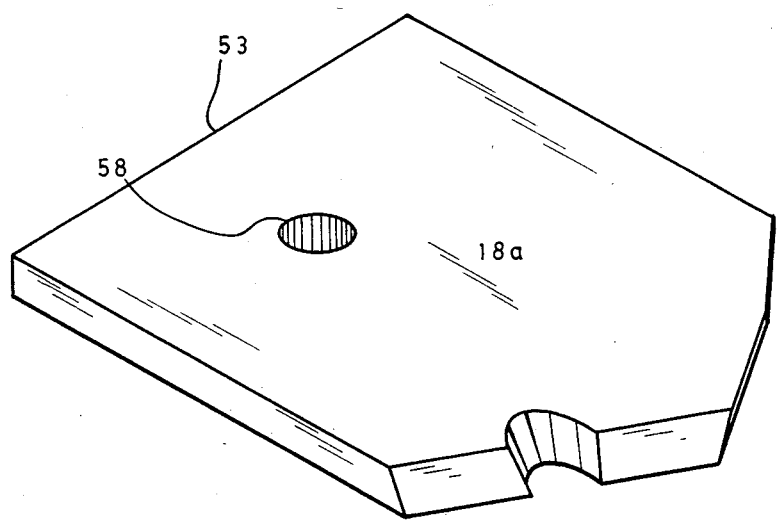
FIG. 6 is a perspective drawing of the embodiment of a cutting bar shown secured in position in FIGS. 4 and 5.

The cutter bar 18a as shown in FIG. 6 is provided with an opening 58 which extends the thickness thereof and can be threadably receptive of the socket head screw 56. The outer end 51 of the shank member 50 is provided with a transverse hole 60 which extends the thickness thereof and also can be threadably receptive of the socket head screw 56. The socket head screw 56 thereby threadably passes through the transverse hole 60 of the shank member 50 and the opening 58 of the cutter bar 18a to longitudinally secure the cutter bar 18a to the outer end 51 of the shank member 50. Alternatively, the screw 56 can pass through the opening 58 and be only threadably engaged with one or both of the arms 54.

It will be recognized that the cutter bar 18a is substantially similar in construction to bar 18 discussed hereinabove and illustrated in FIG. 3. Specifically, the cutting edges of the bar 18a conform in configuration to the cutting edges of bar 18, including the groove across one face and a dual-angle of the other face. It is understood that the position of the transverse hole 60 on the shank member 50, and that of the opening 58 through the cutter bar 18a, can be placed at various locations commensurate with the nature of the metal drilling surface and the desired exposure of the cutter bar 18a. It is also understood that any number of securing devices, including slidably receptive means and/or threadably receptive means, in addition to a socket head screw 56, can be employed as part of the attachment means 52.

From the foregoing detailed description, it will be recognized by those skilled in the art that several advantageous features will be possible by virtue of the detachability characteristic with relation to the shank member 50 and the cutter bar 18a. The detachability characteristic will facilitate convenient removal of the cutter bar 18a for precision sharpening, for example. It will also facilitate diverse selectivity of cutter bars with different chisel points or blade angles for greater specificity with relation to metal, masonry and other types of drilling surfaces. In the event that a cutter bar 18a is damaged beyond use, it will not be necessary to dispose of the entire spade drill bit 10a. The shank member 50 can still be utilized for further drilling services with the replacement of a new cutter bar 18a, thereby saving considerable additional expense. The detachability characteristic will also facilitate a wide selective choice of cutter bars constructed of material exhibiting different degrees of resilience. This will augment the selectivity process to further assure that the correct type of spade drill bit will be employed for use on a specific drilling surface, such as metal, masonry, plastic, wood or other drilling surface.

From the foregoing description, it will be recognized that a spade drill bit for metal, masonry and the like is provided which will produce a circular hole in the material and which provides for the removal of drilling debris more readily from the hole. Furthermore, this construction and the removal of the debris enhances the speed of drilling and reduces the axial force required to move the bit into material to be drilled.

It is, of course, understood that although a preferred embodiment of the present invention has been illustrated and described, various modifications thereof will become apparent to those skilled in the art. Accordingly, the scope of the invention should be defined only by the appended claims and the equivalence thereof.

I claim:

1. An improved spade drill bit comprising:
   an elongated shank member having a first end for engagement by means to rotate said shank about its axis, and a further end;
   a cutter bar having a planar body defining a first end to be releasably carried by said further end of said shank, and a cutting end having oppositely disposed radial edges, said cutting end of said cutter bar having a first and a further surface joined at a chisel point on the axis of said shank, said first and further surface each having a cutting edge and a trailing edge, said first surface being provided with a groove extending from said cutting edge to said trailing edge, the width and depth of said groove at said trailing edge being at least equal to the width and depth of said groove at said cutting edge; and said further surface divided into an inner radial portion and an outer radial portion, said outer radial portion beginning at a dimension equivalent to substantially that of a radial outer edge of said groove in said first surface, said outer radial portion forming an angle with respect to said axis of said shank less than an angle of said inner radial portion with said axis; and
   releasable attachment means associated with said further end of said shank and with said cutter bar for releasably joining said cutter bar to said shank whereby cutting operation is effected by said cutter bar by rotating said shank.

2. The spade drill bit of claim 1 wherein said attachment means comprises:
   a pair of parallel arms extending medianly axially from said shank at said further end defining a medianly axially positioned slot to accept said planar body of said cutter bar, said arms being provided with aligned transverse openings;
   wherein said planar body is provided with an aperture aligned with said openings in said arms when said cutter bar is properly positioned within said slot; and
   a releasable fastening member for passing through said openings in said arms and said aperture in said planar body to fix said body of said cutter bar in said slot.

3. The spade drill bit of claim 2 wherein said fastening member is a headed bolt passing through one of said openings in said arms and said aperture in said body and threadably engaged in the other of said openings in said arms.

4. The spade drill bit of claim 1 wherein said groove on said cutting bar extending from said cutting edge to said trailing edge is U-shaped.

5. The spade drill bit of claim 1 wherein said groove is provided in said first surface substantially midway between said chisel point and a radial extremity of said first surface.

6. The spade drill of claim 1 wherein said width and depth of said groove at said trailing edge are greater than said width and depth of said groove at said cutting edge.

7. The spade drill bit of claim 1 wherein said width and depth of said groove at said cutting edge are about ⅛ to 3/16 inch and ⅛ to 3/16 inch, respectively.

8. An improved spade drill bit comprising:
   an elongated shank member having a first end for engagement by means to rotate said shank about its axis, and a further end;
   a cutter bar having a planar body defining a first end to be releasably carried by said further end of said shank, and a cutting end having oppositely disposed radial edges, said cutting end of said cutter bar having a first and a further surface joined at a chisel point on the axis of said shank, said first and further surface each having a cutting edge and a trailing edge, said first surface being provided with a groove extending from said cutting edge to said trailing edge, the width and depth of said groove at said trailing edge being at least equal to the width and depth of said groove at said cutting edge; and said further surface divided into an inner radial portion and an outer radial portion, said outer radial portion beginning at a dimension equivalent to substantially that of a radial outer edge of said groove in said first surface, said outer radial portion forming an angle with respect to said axis of said shank less than an angle of said inner radial portion with said axis;
   a pair of parallel arms extending medianly axially from said shank at said further end defining a medianly axially positioned slot to accept said planar body of said cutter bar, said arms being provided with aligned transverse openings;
   wherein said planar body is provided with an aperture aligned with said openings in said arms when said cutter bar is properly positioned within said slot; and
   a releasable fastening member for passing through said openings in said arms and said aperture in said planar body to fix said body in said slot.

9. The spade drill bit of claim 8 wherein said shank member is provided with at least one spiral flute.

* * * * *